US010852974B2

(12) United States Patent
Kucherov et al.

(10) Patent No.: US 10,852,974 B2
(45) Date of Patent: Dec. 1, 2020

(54) STORAGE SYSTEM WITH DETECTION AND CORRECTION OF REFERENCE COUNT BASED LEAKS IN PHYSICAL CAPACITY

(71) Applicant: EMC IP Holding Company LLC, Hopkinton, MA (US)

(72) Inventors: Anton Kucherov, Dudley, MA (US); Leron Fliess, Kiryat Ono (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/552,026

(22) Filed: Aug. 27, 2019

(65) Prior Publication Data
US 2020/0012430 A1   Jan. 9, 2020

Related U.S. Application Data

(63) Continuation of application No. 15/933,503, filed on Mar. 23, 2018, now Pat. No. 10,437,501.

(51) Int. Cl.
*G06F 12/00* (2006.01)
*G06F 13/00* (2006.01)
(Continued)

(52) U.S. Cl.
CPC ............ *G06F 3/064* (2013.01); *G06F 3/0604* (2013.01); *G06F 3/0608* (2013.01);
(Continued)

(58) Field of Classification Search
CPC ...... G06F 3/064; G06F 3/0638; G06F 3/0604; G06F 3/0608; G06F 3/0653;
(Continued)

(56) References Cited

U.S. PATENT DOCUMENTS 9,104,326 B2   8/2015 Frank et al.
9,208,162 B1   12/2015 Hallak et al.
(Continued)

FOREIGN PATENT DOCUMENTS

WO   2016111954 A1   7/2016

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Sean D Rossiter
(74) *Attorney, Agent, or Firm* — Ryan, Mason & Lewis, LLP

(57) ABSTRACT

A storage system in one embodiment comprises a plurality of storage devices and an associated storage controller. The storage controller implements a logical storage layer in which logical blocks are associated with respective content-based signatures and a physical storage layer in which the content-based signatures are associated with respective physical blocks in the storage devices. The storage controller maintains reference counts for respective ones of the physical blocks, with a given such reference count indicating a number of the logical blocks that map via their respective content-based signatures to the same physical block, groups the content-based signatures into one or more subsets, and for a given one of the subsets, executes a scan of the logical blocks to detect any discrepancies in the maintained reference counts for the given subset, and corrects detected discrepancies by updating the reference counts for the given subset based at least in part on results of the scan.

20 Claims, 7 Drawing Sheets

(51) Int. Cl.
*G06F 3/06* (2006.01)
*G06F 12/1009* (2016.01)

(52) U.S. Cl.
CPC .......... *G06F 3/0653* (2013.01); *G06F 3/0679* (2013.01); *G06F 12/1009* (2013.01); *G06F 2212/1044* (2013.01); *G06F 2212/657* (2013.01)

(58) Field of Classification Search
CPC ......... G06F 2212/1044; G06F 11/1064; G06F 12/0864; G06F 16/152; G06F 16/137
See application file for complete search history.

(56) References Cited

U.S. PATENT DOCUMENTS

| | | | |
|---|---|---|---|
| 9,286,003 | B1 | 3/2016 | Hallak et al. |
| 10,261,693 | B1 | 4/2019 | Schneider et al. |
| 2013/0262805 | A1* | 10/2013 | Zheng .................. G06F 3/0683 711/162 |
| 2016/0170987 | A1 | 6/2016 | Kesselman |
| 2018/0046546 | A1 | 2/2018 | Qiu et al. |
| 2018/0189132 | A1 | 7/2018 | Malladi et al. |
| 2018/0349374 | A1 | 12/2018 | Gurajada et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.
EMC Corporation, "Introduction to XtremIO Virtual Copies," White Paper, Mar. 2016, 39 pages.
EMC Corporation, "XtremIO Data Production (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
Itzikr, "DellEMC XtremIO X2/X1 Management, Part 1, The CAS Architecture = Simplicity?," https://xtremio.me/2017/05/08/dellemc-xtremio-x2x1-management-part-1-the-cas-architecture-simplicity/, May 8, 2017, 6 pages.
EMC Corporation, "High Availability, Data Protection and Data Integrity in the XtremIO Architecture," White Paper, Apr. 2015, 28 pages.
Itzikr, "DellEMC XtremIO X2 Tech Preview #2—Native Replication," https://xtremio.me/2017/05/09/dellemc-xtremio-x2-tech-preview-2-native-replication/, May 9, 2017, 8 pages.
Dell EMC, "Introduction to Dell EMC XtremIO X2 Storage Array—A Detailed Review," Dell EMC White Paper, Aug. 2017, 46 pages.
EMC Corporation, "EMC Recoverpoint Replication of XtremIO: Understanding the Essentials of RecoverPoint Snap-Based Replication for XtremIO," EMC White Paper, Aug. 2015, 31 pages.

* cited by examiner

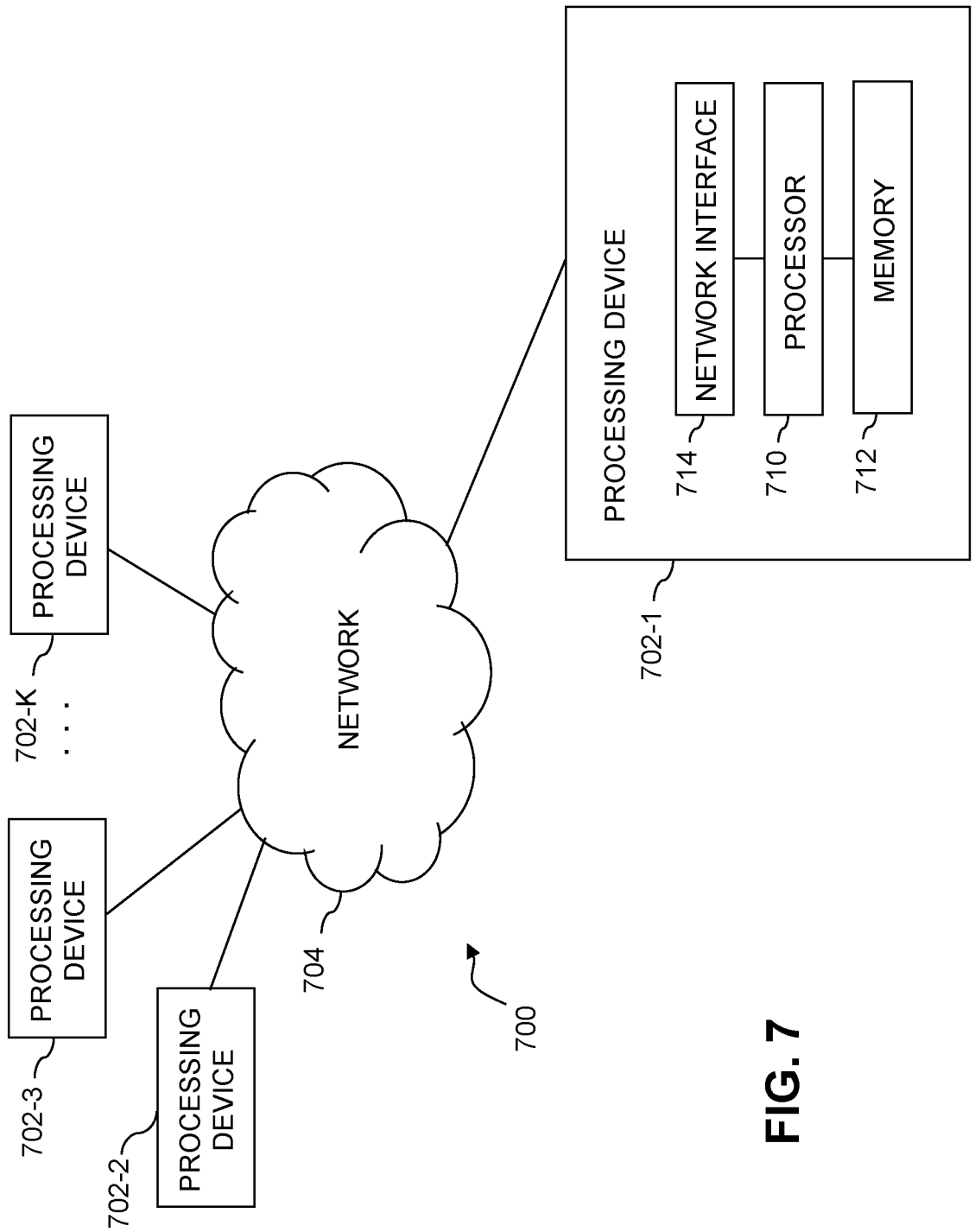

STORAGE SYSTEM WITH DETECTION AND CORRECTION OF REFERENCE COUNT BASED LEAKS IN PHYSICAL CAPACITY

RELATED APPLICATION(S)

The present application is a continuation of U.S. patent application Ser. No. 15/933,503, filed Mar. 23, 2018, and entitled "Storage System with Detection and Correction of Reference Count Based Leaks in Physical Capacity," which is incorporated by reference herein in its entirety.

FIELD

The field relates generally to information processing systems, and more particularly to storage in information processing systems.

BACKGROUND

In many storage systems, it is desirable to provide efficient release of storage capacity, for example, as such storage capacity becomes available due to deletion of storage volumes, in order to better accommodate the input-output (IO) processing demands of system users. However, conventional approaches to storage capacity release can be problematic. For example, in content addressable storage systems, errors in reference counts can lead to so-called "leaks" in physical capacity, where a given block of physical capacity has a non-zero reference count but is not actually utilized by any logical block and should therefore be deleted so as to be released for use by other logical blocks. These blocks of physical capacity are in effect "orphaned" within the storage system, and such orphaned physical capacity creates inefficiencies that can significantly undermine system performance.

SUMMARY

Illustrative embodiments provide techniques for detection and correction of reference count based leaks in physical capacity in a storage system. For example, one or more such embodiments can be advantageously configured to reduce leaks in physical storage capacity of a content addressable storage system by detecting and eliminating orphaned blocks of physical capacity, thereby avoiding the inefficiencies of conventional arrangements. Storage system performance is therefore significantly improved.

These embodiments illustratively include a clustered implementation of a content addressable storage system having a distributed storage controller. Similar advantages can be provided in other types of storage systems.

In one embodiment, a storage system comprises a plurality of storage devices and an associated storage controller. The storage controller implements a logical storage layer in which logical blocks are associated with respective content-based signatures and a physical storage layer in which the content-based signatures are associated with respective physical blocks in the storage devices.

The storage controller maintains reference counts for respective ones of the physical blocks, with a given such reference count indicating a number of the logical blocks that map via their respective content-based signatures to the same physical block.

The storage controller is further configured to detect and correct reference count based leaks in physical capacity of the storage system by grouping the content-based signatures into one or more subsets, and for a given one of the subsets, executing a scan of the logical blocks to detect any discrepancies in the maintained reference counts for the given subset, and correcting detected discrepancies by updating the reference counts for the given subset based at least in part on results of the scan. Such scanning is illustratively repeated for each of a plurality of other subsets of content-based signatures.

In some embodiments, grouping the content-based signatures into one or more subsets comprises grouping the content-based signatures such that the content-based signatures in the given subset all share a common prefix.

The scan in some embodiments involves generating an additional set of reference counts for respective ones of the physical blocks associated with respective ones of the content-based signatures of the given subset.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIGS. 6 and 7 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
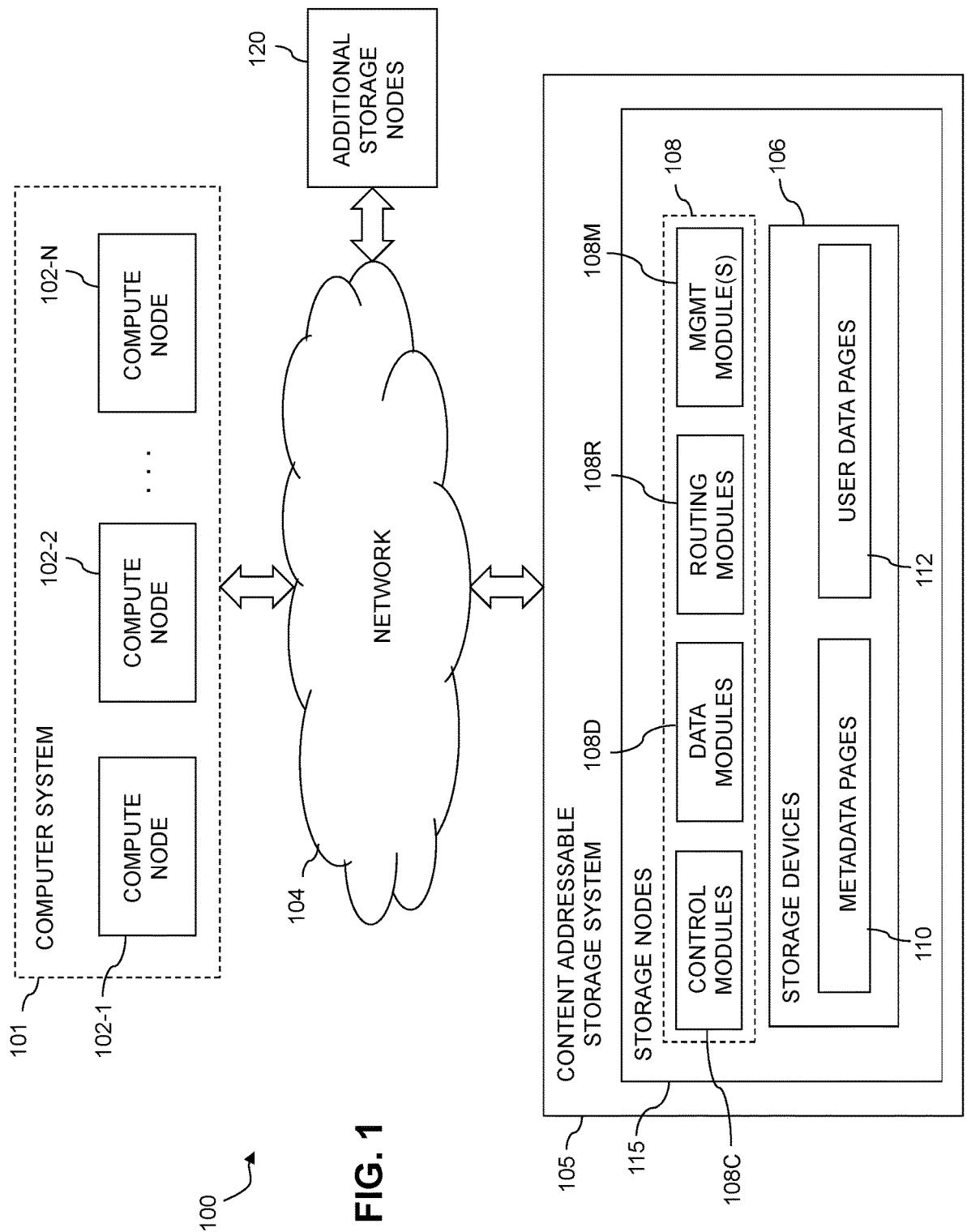
FIG. 1 is a block diagram of an information processing system comprising a content addressable storage system configured with functionality for detection and correction of reference count based leaks in physical capacity in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 may be viewed as examples of what are more generally referred to herein as "host devices" or simply "hosts." Such host devices are configured to write data to and read data from the content addressable storage system 105. The compute nodes 102 and the content addressable storage system 105 may be implemented on a common processing platform, or on separate processing platforms. A wide variety of other types of host devices can be used in other embodiments.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

Such users of the storage system 105 in some cases are referred to herein as respective "clients" of the storage system 105.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106 and an associated storage controller 108. The storage devices 106 are configured to store metadata pages 110 and user data pages 112, and may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data, each also generally referred to herein as a "data item," on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used.

Figure 2:
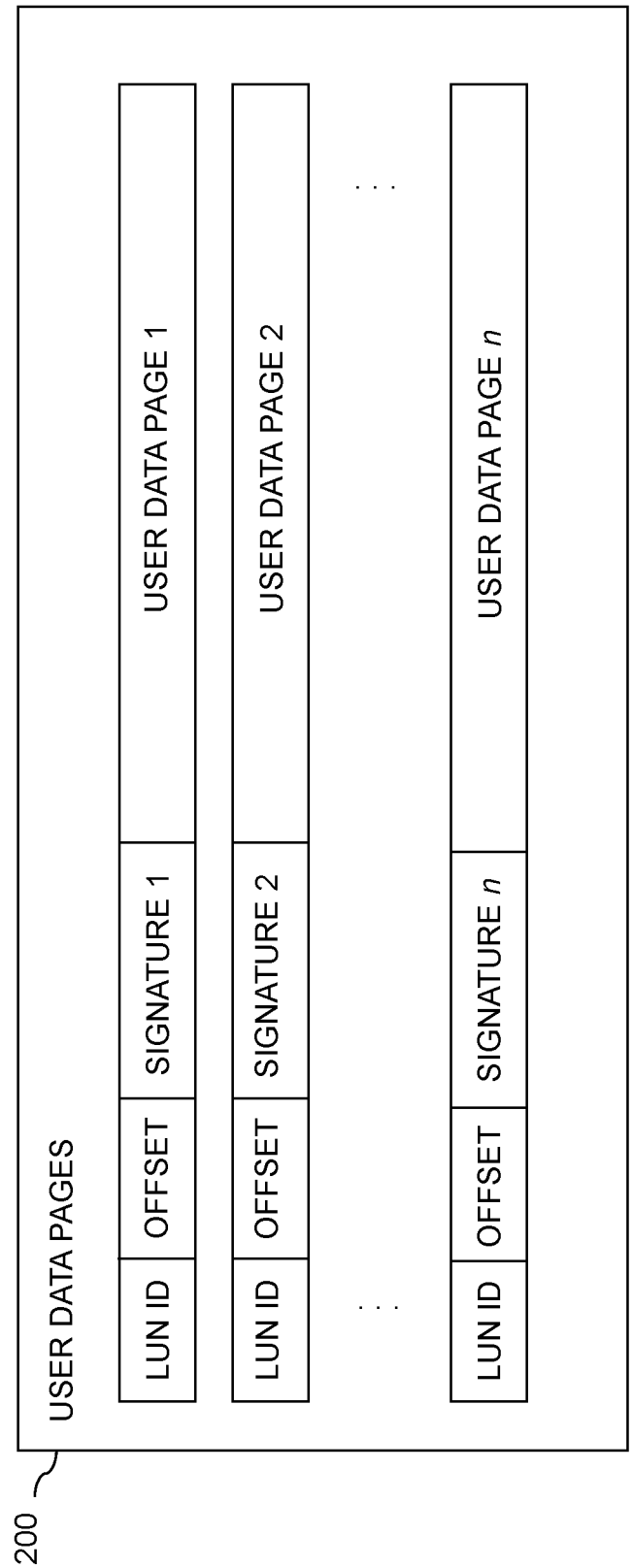
FIG. 2 shows an example of a set of user data pages in an illustrative embodiment.

Each of the metadata pages 110 characterizes a plurality of the user data pages 112. For example, as illustrated in FIG. 2, a given set of user data pages 200 representing a portion of the user data pages 112 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

Figure 3:
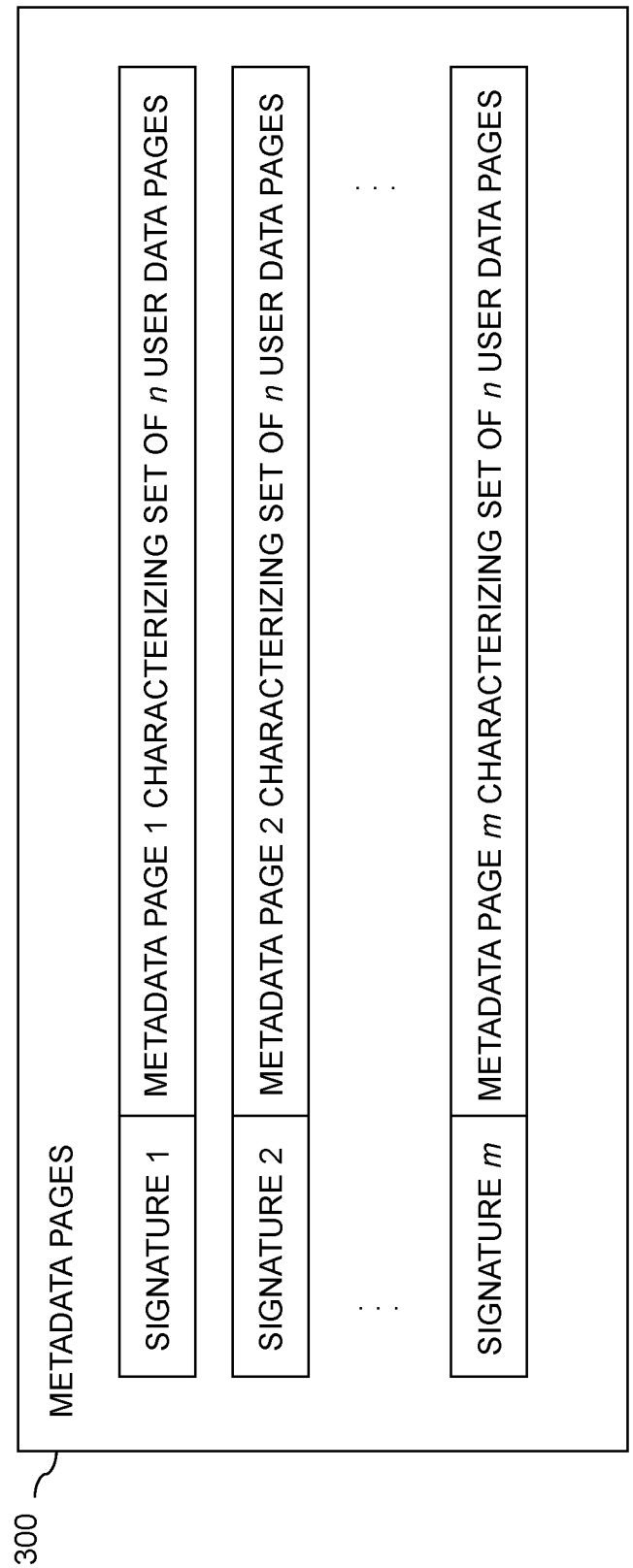
FIG. 3 shows an example of a set of metadata pages in an illustrative embodiment.

This is illustrated in FIG. 3, which shows a given set of metadata pages 300 representing a portion of the metadata pages 110 in an illustrative embodiment. The metadata pages in this example include metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations shown in FIGS. 2 and 3 are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The distributed storage controller 108 in the present embodiment is configured to implement functionality for detection and correction of reference count based leaks in physical capacity in the content addressable storage system 105.

As noted above, the storage devices 106 are configured to store user data pages 200 and metadata pages 300 in respective user data page and metadata page areas. Each of the user data pages 200 comprises a logical address and a content-based signature derived from content of that data page, and each of the metadata pages 300 characterizes a plurality of the user data pages 200 and associates the content-based signatures of those user data pages with respective physical blocks in the storage devices 106.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Communication links may be established between the various processing modules of the distributed storage controller 108 using well-known communication protocols such as Transmission Control Protocol (TCP) and Internet Protocol (IP). For example, respective sets of IP links used in data transfer and corresponding messaging could be associated with respective different ones of the routing modules 108R.

Ownership of a user data logical address space within the content addressable storage system 105 is illustratively distributed among the control modules 108C.

It is desirable in these and other storage system contexts to implement functionality for detection and correction of reference count based leaks in physical capacity across multiple distributed processing modules, such as the processing modules 108C, 108D, 108R and 108M of the distributed storage controller 108. Example implementations of detection and correction of reference count based leaks are also referred to herein as "leak scrubbing" of the physical capacity of the storage system 105.

The management module 108M of the storage controller 108 may include a physical capacity leak scrubbing engine or other arrangement of physical capacity leak scrubbing control logic that engages corresponding control logic instances in all of the control modules 108C and routing modules 108R in order to implement a process for detection and correction of reference count based leaks in physical capacity within the system 100, as will be described in more detail below in conjunction with FIG. 4.

In some embodiments, the content addressable storage system 105 comprises an XtremIO™ storage array suitably modified to incorporate techniques for detection and correction of reference count based leaks in physical capacity as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, functionality for detection and correction of reference count based leaks in physical capacity in some embodiments is implemented under the control of at least one system-wide management module of the distributed storage controller 108, utilizing the C-modules, D-modules and R-modules of the XtremIO™ storage array.

In the above-described XtremIO™ storage array example, each user data page typically has a size of 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Each of the storage nodes 115 of the storage system 105 comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

The term "write request" as used herein is intended to be broadly construed, so as to encompass one or more IO operations directing that at least one data item of a storage system be written to in a particular manner. A given write request is illustratively received in a storage system from a host device. For example, in some embodiments, a write request is received in a distributed storage controller of the storage system, and directed from one processing module to another processing module of the distributed storage controller. More particularly, in the embodiment to be described below in conjunction with FIG. 4, a received write request is directed from a routing module of the distributed storage controller to a particular control module of the distributed storage controller. Other arrangements for receiving and processing write requests from one or more host devices can be used.

Figure 4:
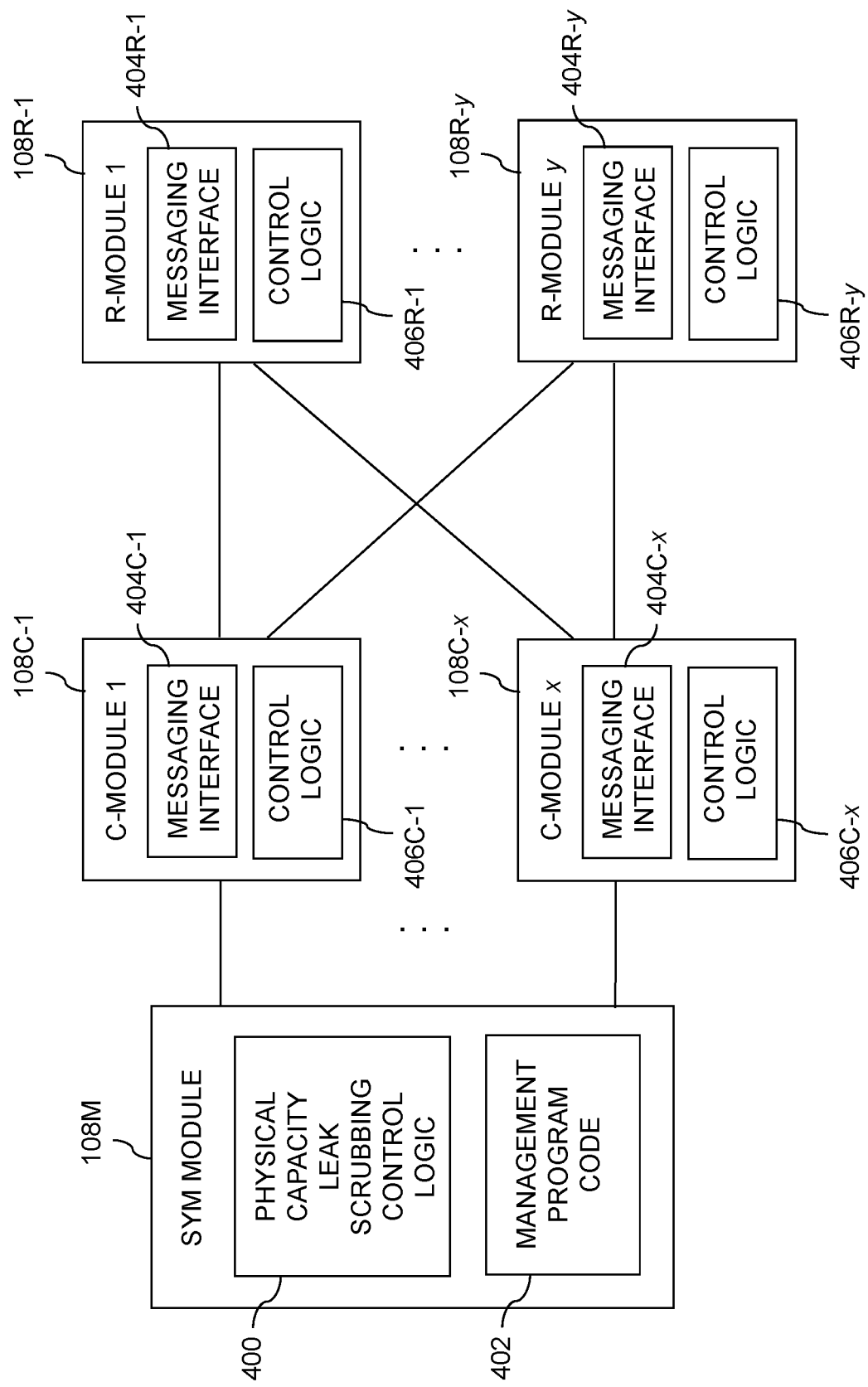
FIG. 4 illustrates a portion of a distributed storage controller of a content addressable storage system showing one possible arrangement supporting detection and correction of reference count based leaks in physical capacity.

Referring now to FIG. 4, a more detailed view of a portion of the distributed storage controller 108 in an illustrative embodiment is shown. This embodiment illustrates an example of communications between control modules 108C and routing modules 108R of the distributed storage controller 108. This embodiment is implemented in the XtremIO™ context, and the C-modules, D-modules and R-modules of the storage nodes 115 in this context are assumed to be configured to communicate with one another over a high-speed internal network such as an InfiniBand network. The C-modules, D-modules and R-modules coordinate with one another to accomplish various IO processing tasks.

The logical block addresses or LBAs of a logical layer of the storage system 105 correspond to respective physical blocks of a physical layer of the storage system 105. The user data pages of the logical layer are organized by LBA and have reference via respective content-based signatures to particular physical blocks of the physical layer.

Each of the physical blocks has an associated reference count that is maintained within the storage system. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises physical capacity leak scrubbing control logic 400 and associated management program code 402. The management module 108M communicates with control modules 108C-1 through 108C-x, also denoted as C-module 1 through C-module x. The control modules 108C communicate with routing modules 108R-1 through 108R-y, also denoted as R-module 1 through R-module y. The variables x and y are arbitrary integers greater than one, and may but need not be equal. In some embodiments, each of the storage nodes 115 of the content addressable storage system 105 comprises one of the control modules 108C and one of the routing modules 108R, as well as one or more additional modules including one of the data modules 108D.

The control modules 108C-1 through 108C-x in the FIG. 4 embodiment comprise respective messaging interfaces 404C-1 through 404C-x. These messaging interfaces 404C are utilized by corresponding instances of control logic 406C-1 through 406C-x to generate, receive and otherwise process messages in conjunction with a process for detection and correction of reference count based leaks in physical capacity.

For example, the messaging interfaces 404C are utilized to generate control-to-routing messages for transmission to the routing modules 108R, and to process routing-to-control messages received from the routing modules 108R. The messaging interfaces 404C also generate messages for transmission to the management module 108M and process instructions and other messages received from the management module 108M in conjunction with performing functions associated with implementation of detection and correction of reference count based leaks in physical capacity.

The routing modules 108R-1 through 108R-y in the FIG. 4 embodiment comprise respective messaging interfaces 404R-1 through 404R-y. These messaging interfaces 404R are utilized by corresponding instances of control logic 406R-1 through 406R-y to generate routing-to-control messages for transmission to one or more of the control modules 108C and to process control-to-routing messages received from one or more of the control modules 108C in conjunction with performing functions associated with detection and correction of reference count based leaks in physical capacity.

The manner in which functionality for detection and correction of reference count based leaks in physical capacity is provided in the FIG. 4 embodiment will now be described. The process is assumed to be carried out by the processing modules 108C, 108D, 108R and 108M. It is further assumed that the control modules 108C write data pages in the content addressable storage system 105 via the data modules 108D in accordance with write requests received from host devices via the routing modules 108R. The host devices illustratively comprise respective ones of the compute nodes 102 of the computer system 101.

The write requests from the host devices identify particular data pages to be written in the storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 105 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 105.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 106. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

Execution of a given write request received in the storage system 105 from a host device illustratively involves the following operations:

1. Receive the write request in a particular control module 108C from a particular routing module 108R.

2. Acquire CIO address range lock for the logical address range to be written, where CIO refers to an IO process component in the control module 108C. As noted above, the control modules have ownership of particular logical address spaces, and the CIO address therefore denotes a global logical address for a given storage block.

3. Perform a read-modify operation if the write is a small or unaligned write. Examples of read-modify operations for use with small or unaligned writes can be found in the above-cited U.S. Pat. No. 9,104,326.

4. Write the data pages to a data module 108D, based on a hash-to-data ("H2D") table. New hash handles are generated for the respective data pages, and reference counts associated with the new hash handles are incremented.

5. Release the CIO address range lock.

6. Send a response back to the requesting routing module 108R.

7. Decrement reference counts associated with the old hash handles of respective data pages that have been overwritten. These are examples of what are more generally referred to herein as "dereferencing operations."

The reference counts mentioned above are illustratively maintained for respective physical blocks in the storage devices 106 and each such reference count indicates for its corresponding physical block the number of logical blocks that point to that same physical block. When all logical block references to a given physical block are removed, the reference count for that physical block becomes zero and its capacity can be released. A given "dereferencing operation" as that term is broadly used herein is intended to encompass decrementing of a reference count associated with a physical block.

As mentioned previously, in conjunction with release of logical address space in the storage system 105, the storage controller 108 makes the released logical address space available to users, executes dereferencing operations for respective ones of the physical blocks corresponding to the released logical address space, and releases any physical capacity for which the corresponding reference counts reach zero.

Techniques for efficient release of logical and physical capacity in a storage system such as storage system 105 are disclosed in U.S. patent application Ser. No. 15/884,577, filed Jan. 31, 2018 and entitled "Storage System with Decoupling and Reordering of Logical and Physical Capacity Removal," which is incorporated by reference herein. Such techniques may be utilized in illustrative embodiments disclosed herein, but are not required in any particular illustrative embodiment.

The logical address space illustratively comprises one or more ranges of logical block addresses or LBAs each comprising a LUN ID and an offset. For example, each LBA can identify a particular one of the user data pages 200. The LBAs each correspond to one or more physical blocks in the storage devices 106. Other types of LBAs and logical address spaces can be used in other embodiments. The term "logical address" as used herein is therefore intended to be broadly construed.

A given such logical address space may be released responsive to deletion of a corresponding storage volume, snapshot or any other arrangement of data stored in the storage system 105. Other conditions within the storage system 105 can also result in release of logical address space.

The storage controller 108 illustratively makes the released logical address space available to users in order of released logical address. More particularly, the storage controller 108 can make the released logical address space available to users in order of released logical address by making each of its corresponding released logical addresses immediately available responsive to that logical address being released. For example, release of one or more LBAs or a range of LBAs by one or more users can result in those LBAs being made available to one or more other users in the same order in which the LBAs are released.

The corresponding physical blocks may be released in a different order, through accumulation and reordered execution of dereferencing operations as described in the above-cited U.S. patent application Ser. No. 15/884,577. For example, the storage controller 108 in some embodiments accumulates multiple dereferencing operations for each of at least a subset of the metadata pages 300, and executes the accumulated dereferencing operations for a given one of the metadata pages 300 responsive to the accumulated dereferencing operations for the given metadata page reaching a threshold number of dereferencing operations.

In executing the accumulated dereferencing operations for the physical blocks, execution of each of the dereferencing operations more particularly involves decrementing a reference count of a corresponding one of the physical blocks, and releasing the physical block responsive to the reference count reaching a designated number, such as zero. Moreover, in executing the accumulated dereferencing operations for the physical blocks, at least a subset of the accumulated dereferencing operations are first reordered into an order that more closely matches a physical layout of the corresponding physical blocks on the storage devices 106. The reordered dereferencing operations are then executed in that order.

As a result, the physical blocks may be released in the storage system 105 in a different order than that in which their corresponding logical blocks are released. This provides a number of significant advantages as outlined in the above-cited U.S. patent application Ser. No. 15/884,577.

Other embodiments can be configured to release physical capacity in other ways. For example, physical capacity in some embodiments can be released in the same order in which logical capacity is released.

As indicated above, the storage controller 108, illustratively comprising the modules 108C, 108R and 108M as illustrated in FIG. 4 as well as additional modules such as data modules 108D, is configured to implement functionality for detection and correction of reference count based leaks in physical capacity in the content addressable storage system 105. Such an arrangement reduces leaks in the physical storage capacity of the content addressable storage system 105 by detecting and eliminating orphaned blocks of physical capacity, that is, physical blocks having non-zero reference counts but no associated logical blocks. This ideally allows all unused blocks of physical capacity to be released within the system.

In this embodiment, the storage controller 108 is configured to implement a logical storage layer in which logical blocks are associated with respective content-based signatures and a physical storage layer in which the content-based signatures are associated with respective physical blocks in the storage devices 106. As part of this process, the storage controller 108 maintains reference counts for respective ones of the physical blocks, with a given such reference count indicating a number of the logical blocks that map via their respective content-based signatures to the same physical block.

In order to detect and correct reference count based leaks in physical capacity, the storage controller 108 via the physical capacity leak scrubbing control logic 400 and associated management program code 402 of the management module 108M scans logical blocks of the logical layer for each of a plurality of groups of content-based signatures.

For example, in some embodiments, the content-based signatures are grouped into subsets, and for a given one of the subsets, a scan of the logical blocks is executed in order to detect any discrepancies in the maintained reference counts for the given subset. Any such detected discrepancies are corrected by updating the reference counts for the given subset based at least in part on results of the scan.

Discrepancies in the maintained reference counts can arise under a number of different conditions. In some cases, these discrepancies are attributable at least in part to the fact that the content addressable storage system 105 maintains separate logical and physical layers. For example, if the system is configured to first delete a given block of logical capacity and then to decrement the reference count of the corresponding physical block, it is possible that a system crash or other type of error arising between those two events can lead to a reference count error and a corresponding orphaned physical block. As indicated previously, this is an example of what is referred to herein as a reference count based leak in physical capacity.

In conjunction with the scan of a given subset, the storage controller 108 is further configured to detect a potentially content-altering access to at least one of the logical blocks having a content-based signature in the given subset that occurs during the scan of that subset, and to invalidate the scan of the given subset responsive to detection of the potentially content-altering access. Such an arrangement ensures that a potentially content-altering access to any data page having a content-based signature in the given subset that occurs during the scan of that subset will invalidate the associated scan results, as it might lead to changes in the reference counts. Appropriate selection of the scan subset size can minimize the likelihood and any associated adverse impacts of such access-based scan invalidation.

The grouping of the content-based signatures into one or more subsets illustratively comprises grouping the content-based signatures such that the content-based signatures in the given subset all share a common prefix. For example, the common prefix may comprise a specified number of initial bytes of each of the content-based signatures in the given subset with the initial bytes each having a designated value. More particularly, the common prefix may comprise x initial bytes of the content-based signatures having respective designated values $y_1, \ldots y_x$ such that the given subset represents a fraction $$\frac{1}{256^x}$$

of a total scan space of at least one logical storage volume of the logical storage layer.

In some embodiments, hashes or other types of content-based signatures are substantially uniformly distributed over the corresponding hash space or other type of content-based signature space. As a result, the subsets of the hash space or other type of content-based signature space are also substantially uniformly distributed.

The scan may illustratively encompass a logical storage space of the full content addressable storage system 105, for example, in embodiments in which the hash space or other content-based signature space is global and encompasses the entire storage capacity of the content addressable storage system 105.

The storage controller 108 may be configured to control a size of the given subset by altering one or more parameters of the common prefix shared by the content-based signatures of the given subset.

In some embodiments, the scan of the given subset of content-based signatures is initiated as a background process of the physical storage layer. Scanning of other subsets of content-based signatures are initiated in a similar manner.

The storage controller 108 is further configured to generate as part of the scan an additional set of reference counts for respective ones of the physical blocks associated with respective ones of the content-based signatures of the given subset. The results of the scan in such an arrangement comprise differences between particular ones of the additional reference counts generated as part of the scan and corresponding ones of the maintained reference counts, with each such difference indicating a reference count discrepancy.

In some embodiments, the storage controller 108 utilizes a first portion of a designated number of bits for the maintained reference count for a corresponding one of the physical blocks, and utilizes a second portion of the designated number of bits for an additional reference count generated as part of the scan for the corresponding physical block. For example, the designated number of bits may comprise one or more bytes and the first and second portions of the designated number of bits may comprise respective lower order and upper order portions of the one or more bytes.

In other embodiments, the storage controller 108 utilizes a first portion of a designated number of bits for the maintained reference count for a corresponding one of the physical blocks, and utilizes a second portion of the designated number of bits to indicate whether or not at least one logical block having the content-based signature associated with the corresponding physical block was identified during the scan. For example, the second portion may comprise a single bit of the designated number of bits.

As mentioned previously, scans of other subsets of content-based signatures are carried out in a similar manner.

In some embodiments, scans of other subsets of content-based signatures can be selectively controlled. For example, the storage controller 108 may be configured to initiate a scan of another one of the subsets of content-based signatures responsive to the scan of the given subset of content-based signatures resulting in detection of at least a threshold number of reference count discrepancies.

In one or more of the embodiments described above, the storage controller 108 of the content addressable storage system 105 illustratively scans at least one logical storage volume or other set of logical blocks based on subsets of hash handles, hash digests or other content-based signatures, detects reference count discrepancies for the corresponding physical blocks, and updates the persisted reference counts to correct for any such detected discrepancies. The physical layer of the storage system 105 illustratively controls the "bookkeeping" of the checked reference counts and of any content-based signatures changed during the scan.

The scan of the logical blocks illustratively comprises a full system scan of an entire logical storage space of the content addressable storage system 105. Alternatively, some embodiments may separately scan different logical volumes or sets of logical volumes that are part of separate hash spaces or other types of separate content-based signature spaces within the content addressable storage system 105.

A more particular example of a process for reference count based leak detection and correction using subsets of a hash space of the storage system 105 illustratively includes the following steps:

1. A background process running in the physical layer initiates a scan of logical blocks in the logical layer for each of a plurality of subsets of a partitioned hash space. Each scan checks reference counts for the hash handles ("hashes") in a corresponding one of the subsets against the logical blocks. A given subset is illustratively defined as all hashes sharing a certain set of initial bytes. For example, in the case of a 6-byte hash, a given subset may comprise all hashes starting with the letters "ab" which will effectively yield a scan of $$\frac{1}{256^2}$$

of the hash space. The length of the scan and the amount of storage system memory required for its execution can be controlled by adjusting the size of the scan subsets. For example, a larger subset will tend to make the scan more effective in terms of passes of the logical layer, but may yield more invalid hashes and would consume more memory.

2. During the scan of a given subset, the physical layer will monitor any changes to any of the hashes in the subset. For example, the content of a given logical block may be updated, in which case its content-based hash would also change. Since the physical layer is the sole owner of the physical blocks corresponding to the respective hashes of the subset, it will not miss any such hash changes. A change to a given hash would invalidate the scan result. However, since only a subset of the hash space is being scanned as part of the scan, such changes will be of low probability and most scan results will be valid.

3. If a logical block of the logical layer matches a hash of the subset being scanned, the match is reported by the logical layer to the physical layer. The logical layer does not need to use any memory for the scan, and the physical layer only needs enough memory to maintain an additional reference count for each hash in the subset being scanned. The additional reference count in some embodiments can be implemented with zero additional memory, by using a portion of the bits reserved for the maintained reference count for the additional reference count generated as part of the scan. For example, if a byte is reserved for the usual maintained reference count, the upper four bits of that byte can be used for the additional reference count. Any hashes that need those upper four bits for the usual maintained reference count can be ignored within the scan. As another example, a single "encountered" bit could be used to indicate if the corresponding hash was encountered in the scan of the logical blocks. When a hash match is reported to the physical layer, the physical layer increases the scan reference count or sets the encountered bit. If a hash is reported by the logical layer that is not known to the physical layer, a corrupt data alert is raised, to indicate that a logical block is pointing to an unknown hash.

4. When the scan of all the logical blocks is completed, and assuming that the scan was not invalidated due to a hash change, the physical layer will update any reference counts that were found to disagree with the scan results. If a given such updated reference count reaches zero, the corresponding physical capacity is released. The hashes are illustratively locked during update of their respective reference counts.

5. The physical layer reports the results for the scan of the given subset of hashes and then initiates a scan of another subset of hashes. In some embodiments, scans of other subsets may not be initiated unless a minimum threshold number of reference count based leaks were detected, or unless a threshold amount of physical space was reclaimed. Additionally or alternatively, scans may be initiated periodically or under other conditions.

It is to be appreciated that these particular process steps are exemplary only, and can be varied in other embodiments. For example, embodiments disclosed herein as performing scans using hash handles can be modified in a straightforward manner to utilize hash digests or other arrangements of content-based signatures.

The above-described reference count based leak detection and correction functionality of the storage controller 108 is carried out under the control of the physical capacity leak scrubbing control logic 400 and management program code 402 of the management module 108M, operating in conjunction with corresponding control logic instances 406C and 406R of the respective control 108C and routing modules 108R, to access the data modules 108D. The modules 108C, 108D, 108R and 108M of the distributed storage controller 108 therefore collectively implement an illustrative process for detection and correction of reference count based leaks in physical capacity of content addressable storage system 105.

The particular interconnection and signaling arrangements illustrated for processing modules 108C, 108R and 108M in FIG. 4 are presented by way of example only, and can be varied in other embodiments.

In some embodiments, the control logic instances of these processing modules comprise respective portions of a capacity release engine of the storage controller 108.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for detection and correction of reference count based leaks in physical capacity in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, compute nodes 102, network 104, content addressable storage system 105, storage devices 106, storage controller 108 and storage nodes 115 and 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with functionality for detection and correction of reference count based leaks in physical capacity can be offered to cloud infrastructure customers or other users as a PaaS offering.

Figure 5:
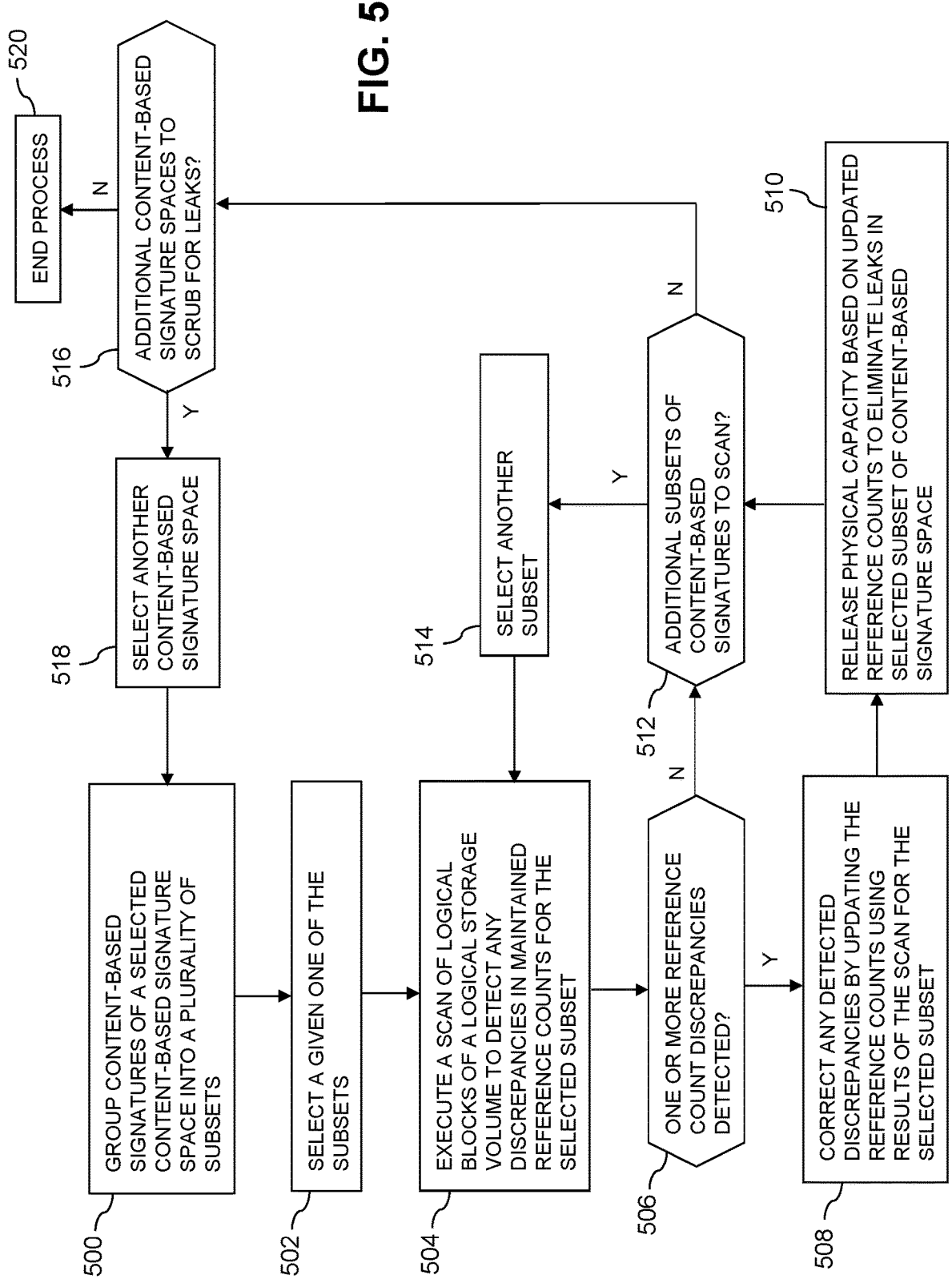
FIG. 5 is a flow diagram of a process for detection and correction of reference count based leaks in physical capacity in an illustrative embodiment.

Additional details of illustrative embodiments will be described below with reference to the flow diagram of FIG. 5. FIG. 5 more particularly shows an example of a process for detection and correction of reference count based leaks in physical capacity implemented in storage system such as content addressable storage system 105 of the FIG. 1 embodiment. The content addressable storage system 105 may comprise a scale-out all-flash storage array such as an XtremIO™ storage array. A given such storage array can be configured to provide storage redundancy using well-known RAID techniques such as RAID 5 or RAID 6, although other storage redundancy configurations can be used.

The term "storage system" as used herein is therefore intended to be broadly construed, and should not be viewed as being limited to content addressable storage systems or flash-based storage systems.

The storage devices of such a storage system illustratively implement a plurality of LUNs configured to store files, blocks, objects or other arrangements of data.

A given storage system can be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

As a more particular example, components of a distributed storage controller can each be implemented in the form of one or more LXCs running on one or more VMs. Other arrangements of one or more processing devices of a processing platform can be used to implement a distributed storage controller and/or its components. Other portions of the information processing system 100 can similarly be implemented using one or more processing devices of at least one processing platform.

The term "processing platform" as used herein is intended to be broadly construed so as to encompass, by way of illustration and without limitation, multiple sets of processing devices and associated storage systems that are configured to communicate over one or more networks.

The operation of the information processing system 100 will now be further described with reference to the flow diagram of the illustrative embodiment of FIG. 5. The process as shown includes steps 500 through 520, and is suitable for use in the system 100 but is more generally applicable to other types of information processing systems each comprising one or more storage systems. The steps are illustratively performed by cooperative interaction of control logic instances of processing modules of a distributed storage controller. A given such storage controller can therefore comprise a distributed storage controller implemented in the manner illustrated in FIGS. 1 and 4.

In step 500, content-based signatures of a selected content-based signature space are grouped into subsets. The content-based signature space in some embodiments is the full content-based signature space of the content addressable storage system 105. Alternatively, the full content-based signature space of the content addressable storage system 105 may be separated into two or more non-overlapping content-based signature spaces, with leak scrubbing being applied separately to each of those spaces.

In some embodiments, grouping the content-based signatures into one or more subsets comprises grouping the content-based signatures such that the content-based signatures in the selected subset all share a common prefix. For example, the common prefix may comprise a specified number of initial bytes of each of the content-based signatures in the selected subset with the initial bytes each having a designated value.

In step 502, a given one of the subsets of content-based signatures of the content-based signature space is selected.

In step 504, a scan of the logical blocks of at least one logical storage volume is executed in order to detect any discrepancies in maintained reference counts for the selected subset of content-based signatures. In some embodiments, the scan of the logical blocks comprises a full system scan of an entire logical storage space of the content addressable storage system 105. Alternatively, some embodiments may separately scan different logical volumes or sets of logical volumes that are part of separate hash spaces or other types of separate content-based signature spaces within the content addressable storage system 105.

In step 506, a determination is made as to whether or not one or more reference count discrepancies have been detected. Such a discrepancy is illustratively indicated as a difference between a maintained reference count for a physical block corresponding to a particular content-based signature of the selected subset, and an additional reference count taken for that physical block as part of the scan. In other words, a discrepancy may be indicated if, after scanning all of the logical blocks, the resulting number of logical blocks that are found to share the particular content-based signature differs from the number indicated by the maintained reference count for the corresponding physical block. For example, the scan may indicate that none of the logical blocks point to the physical block associated with the particular content-based signature, while the reference count maintained for that physical block has a non-zero reference count. This would be an indication of an orphaned physical block, also referred to herein as a reference count based leak in physical capacity.

Some embodiments therefore generate as part of the scan an additional set of reference counts for respective ones of the physical blocks associated with respective ones of the content-based signatures of the selected subset.

If at least one reference count discrepancy is detected, the process moves to step 508, and otherwise moves to step 512.

In step 508, any detected discrepancies are corrected by updating the maintained reference counts using results of the scan for the selected subset. For example, the maintained reference count for a physical block associated with a content-based signature for which a reference count discrepancy is detected as part of the scan may be updated by replacing that maintained reference count with the additional reference count taken for that physical block as part of the scan. Other types of detection and correction techniques can be used to address reference count discrepancies in other embodiments. After correction of any detected discrepancies in step 508, the process moves to step 510.

In step 510, physical capacity is released based on the updated reference counts. For example, one or more detected and corrected leaks in physical capacity may result in updated reference counts of zero for one or more content-based signatures of the selected subset, with the corresponding physical capacity being released in step 510, thereby eliminating the one or more leaks and increasing the available physical capacity of the content addressable storage system 105. The process then moves to step 512.

In step 512, a determination is made as to whether or not there are any additional subsets of content-based signatures to scan in the content-based signature space.

If there is at least one such additional subset of content-based signatures to be scanned, the process moves to step 514 to select another subset, and then repeats steps 504 and 506, and possibly also steps 508 and 510, to detect and correct any reference count discrepancies found in the newly-selected subset. This process continues until all of the subsets are scanned, after which a negative determination in step 512 causes the process to move to step 516.

Steps 516 and 518 are utilized if the content-based signature space grouped into subsets in the previous iteration of step 500 was not the full content-based signature space of the content addressable storage system 105. If there are multiple non-overlapping content-based signature spaces in the storage system 105, step 516 determines if there are any additional content-based signature spaces to be scrubbed for leaks using steps 500 through 514.

If there is at least one such additional content-based signature space to be scrubbed for leaks, one such additional space is selected in step 518, and steps 500 through 514 are repeated for that additional space, until all such spaces are scrubbed for leaks, at which point the process ends in step 520.

In embodiments in which the initial content-based signature space grouped into subsets in step 500 is the full content-based signature space of the storage system 105, steps 516 and 518 are eliminated, and the process ends in step 520 after it is determined that there are no additional subsets of content-based signatures to scan in step 512.

In an alternative embodiment, the release of physical capacity may be performed after all of the subsets of content-based signatures are processed through steps 504 and 506, and possibly also step 508. In other words, step 510 is moved in such an embodiment to the negative output of step 512.

Different instances of the FIG. 5 process may be performed for respective different instances of physical capacity leak scrubbing for different portions of a storage system or different storage systems.

It is also to be appreciated that the FIG. 5 process and other features and functionality for detection and correction of reference count based leaks in physical capacity as described above can be adapted for use with other types of information systems, including by way of example an information processing system in which the host devices and the storage system are both implemented on the same processing platform.

The particular processing operations and other system functionality described in conjunction with the flow diagram of FIG. 5 are presented by way of illustrative example only, and should not be construed as limiting the scope of the disclosure in any way. Alternative embodiments can use other types of processing operations for implementing detection and correction of reference count based leaks in physical capacity. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different process instances for detection and correction of reference count based leaks in physical capacity for respective different storage systems or portions thereof within a given information processing system.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 that is configured to control performance of one or more steps of the FIG. 5 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, as well as other system components, may be implemented at least in part using processing devices of such processing platforms. For example, in a distributed implementation of the storage controller 108, respective distributed modules of such a storage controller can be implemented in respective LXCs running on respective ones of the processing devices of a processing platform.

In some embodiments, the storage system comprises an XtremIO™ storage array suitably modified to incorporate techniques for detection and correction of reference count based leaks in physical capacity as disclosed herein.

As described previously, in the context of an XtremIO™ storage array, the control modules 108C, data modules 108D, routing modules 108R and management module(s) 108M of the distributed storage controller 108 in system 100 illustratively comprise C-modules, D-modules, R-modules and SYM module(s), respectively. These exemplary processing modules of the distributed storage controller 108 can be configured to implement functionality for detection and correction of reference count based leaks in physical capacity in accordance with the FIG. 5 process.

The techniques for detection and correction of reference count based leaks in physical capacity implemented in the embodiments described above can be varied in other embodiments. For example, different types of process operations can be used in other embodiments.

In addition, the above-described functionality associated with C-module, D-module, R-module and SYM module components of an XtremIO™ storage array can be incorporated into other processing modules or components of a centralized or distributed storage controller in other types of storage systems.

Illustrative embodiments of content addressable storage systems or other types of storage systems with functionality for detection and correction of reference count based leaks in physical capacity as disclosed herein can provide a number of significant advantages relative to conventional arrangements.

For example, some embodiments can advantageously avoid physical capacity leaks resulting from orphaned physical blocks that have non-zero reference counts but do not correspond to any actual logical block. Such arrangements make more efficient use of storage capacity and thereby improve storage system performance. These advantages are achieved in some embodiments with only very limited amounts of system resources being consumed for leak scrubbing overhead.

Illustrative embodiments can include any of a wide variety of different types of storage systems having distinct logical and physical storage layers in which reference count based leaks in physical capacity can occur.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage system 105, or portions thereof, is illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
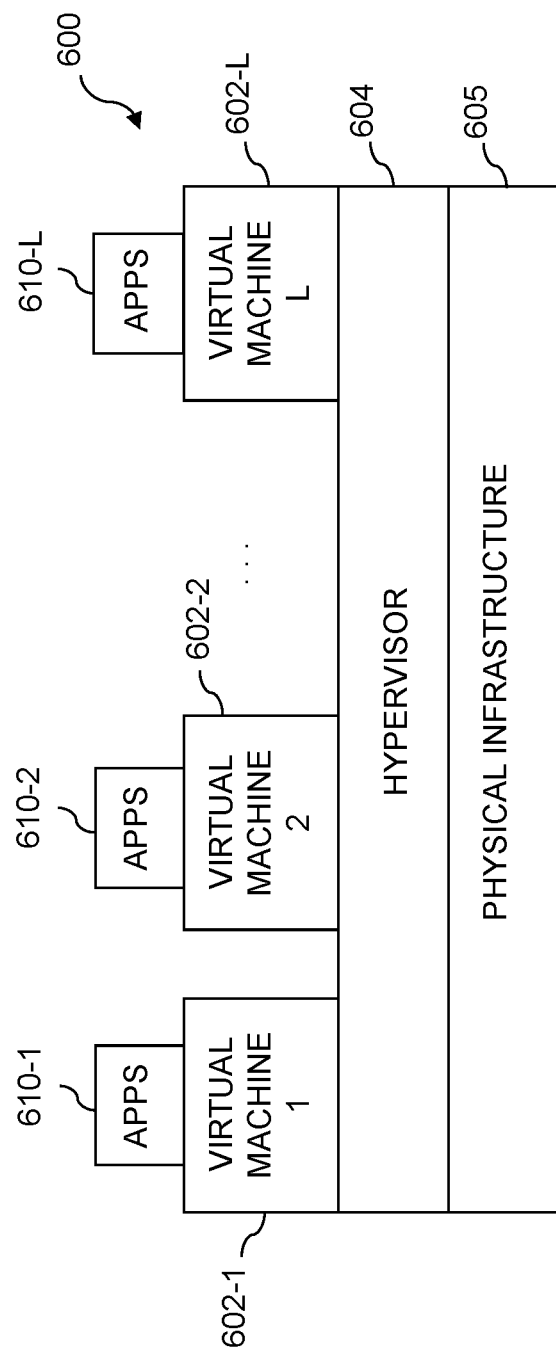

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controller 108 of system 100 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage nodes, storage devices, storage controllers, processing modules, physical capacity leak detection and correction processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
wherein said at least one processing device is configured:
for a designated group of logical blocks of a content addressable storage system, the designated group comprising a subset of the logical blocks of the content addressable storage system, the subset of logical blocks sharing at least one designated characteristic not shared by other ones of the logical blocks that are not in the subset:
to scan the logical blocks of the designated group;
to identify based at least in part on results of the scan at least one physical block that has a discrepancy in its reference count, the reference count indicating a number of the logical blocks that map via their respective content-based signatures to the same physical block; and
to modify the reference count of the identified physical block.

2. The apparatus of claim 1 wherein said at least one processing device implements a storage controller of the content addressable storage system.

3. The apparatus of claim 1 wherein identifying based at least in part on results of the scan at least one physical block that has a discrepancy in its reference count comprises identifying at least one physical block that has a non-zero reference count but is not associated with any of the logical blocks.

4. The apparatus of claim 1 wherein the content addressable storage system comprises a logical storage layer in which logical blocks are associated with respective content-based signatures and a physical storage layer in which the content-based signatures are associated with respective physical blocks.

5. The apparatus of claim 4 wherein said at least one processing device is further configured to maintain reference counts for respective ones of the physical blocks, with a given such reference count indicating a number of the logical blocks that map via their respective content-based signatures to the same physical block.

6. The apparatus of claim 5 wherein said at least one processing device is further configured:
to group the content-based signatures into one or more subsets; and
for a given one of the subsets:
to execute a scan of the logical blocks to detect one or more discrepancies in the maintained reference counts for the given subset; and
to correct the one or more detected discrepancies by updating the reference counts for the given subset based at least in part on results of the scan.

7. The apparatus of claim 6 wherein said at least one processing device is further configured:
to detect a potentially content-altering access to at least one of the logical blocks having a content-based signature in the given subset that occurs during the scan of that subset; and
to invalidate the scan of the given subset responsive to detection of the potentially content-altering access.

8. The apparatus of claim 6 wherein grouping the content-based signatures into one or more subsets comprises grouping the content-based signatures such that the content-based signatures in the given subset all share a common prefix.

9. The apparatus of claim 8 wherein the common prefix comprises a specified number of initial bytes of each of the content-based signatures in the given subset with the initial bytes each having a designated value.

10. The apparatus of claim 9 wherein the common prefix comprises x initial bytes of the content-based signatures having respective designated values $y_1, \ldots y_x$ and further wherein the given subset represents a specified fraction of a total scan space of at least one logical storage volume of the logical storage layer, the specified fraction being determined at least in part as a function of x.

11. The apparatus of claim 8 wherein said at least one processing device is further configured to control a size of the given subset by altering one or more parameters of the common prefix shared by the content-based signatures of the given subset.

12. The apparatus of claim 6 wherein said at least one processing device is further configured to generate as part of the scan an additional set of reference counts for respective ones of the physical blocks associated with respective ones of the content-based signatures of the given subset.

13. The apparatus of claim 12 wherein the results of the scan comprise differences between particular ones of the additional reference counts generated as part of the scan and corresponding ones of the maintained reference counts with each such difference indicating a reference count discrepancy.

14. The apparatus of claim 12 wherein said at least one processing device is further configured:
to utilize a first portion of a designated number of bits for the maintained reference count for a corresponding one of the physical blocks; and
to utilize a second portion of the designated number of bits for an additional reference count generated as part of the scan for the corresponding physical block.

15. A method comprising:
for a designated group of logical blocks of a content addressable storage system, the designated group comprising a subset of the logical blocks of the content addressable storage system, the subset of logical blocks sharing at least one designated characteristic not shared by other ones of the logical blocks that are not in the subset:
scanning the logical blocks of the designated group;
identifying based at least in part on results of the scan at least one physical block that has a discrepancy in its reference count, the reference count indicating a number of the logical blocks that map via their respective content-based signatures to the same physical block; and
modifying the reference count of the identified physical block;
wherein the method is implemented by at least one processing device comprising a processor coupled to a memory.

16. The method of claim 15 wherein identifying based at least in part on results of the scan at least one physical block that has a discrepancy in its reference count comprises identifying at least one physical block that has a non-zero reference count but is not associated with any of the logical blocks.

17. The method of claim 15 wherein the content addressable storage system comprises a logical storage layer in which logical blocks are associated with respective content-based signatures and a physical storage layer in which the content-based signatures are associated with respective physical blocks.

18. A computer program product comprising a non-transitory processor-readable storage medium having stored therein program code of one or more software programs, wherein the program code when executed by at least one processing device causes said at least one processing device:

for a designated group of logical blocks of a content addressable storage system, the designated group comprising a subset of the logical blocks of the content addressable storage system, the subset of logical blocks sharing at least one designated characteristic not shared by other ones of the logical blocks that are not in the subset:

to scan the logical blocks of the designated group;

to identify based at least in part on results of the scan at least one physical block that has a discrepancy in its reference count, the reference count indicating a number of the logical blocks that map via their respective content-based signatures to the same physical block; and to modify the reference count of the identified physical block.

19. The computer program product of claim 18 wherein identifying based at least in part on results of the scan at least one physical block that has a discrepancy in its reference count comprises identifying at least one physical block that has a non-zero reference count but is not associated with any of the logical blocks.

20. The computer program product of claim 18 wherein the content addressable storage system comprises a logical storage layer in which logical blocks are associated with respective content-based signatures and a physical storage layer in which the content-based signatures are associated with respective physical blocks.

* * * * *